Oct. 7, 1952    E. PLEASANCE    2,612,794
CLAMP

Filed Sept. 11, 1947    2 SHEETS—SHEET 1

EDWIN PLEASANCE
INVENTOR.

BY
C. C. McRae
J. R. Faulkner
T. H. Oster

ATTORNEYS

Oct. 7, 1952     E. PLEASANCE     2,612,794
CLAMP

Filed Sept. 11, 1947     2 SHEETS—SHEET 2

EDWIN PLEASANCE
INVENTOR.

BY

ATTORNEYS

Patented Oct. 7, 1952

2,612,794

UNITED STATES PATENT OFFICE 2,612,794

CLAMP

Edwin Pleasance, Detroit, Mich., assignor to Ford Motor Company, Dearborn, Mich., a corporation of Delaware Application September 11, 1947, Serial No. 773,353

2 Claims. (Cl. 77—62)

This application is concerned with a machining clamp and more particularly with a clamp especially adapted to hold a series of identical pieces for machining. In many manufacturing operations it is necessary to perform the same operation on such a series of identical pieces. In repetitive operations of this type the securing of the work piece prior to and during machining is a fatiguing and expensive hand operation. Those familiar with the machine tool art can recall many devices which have been offered to decrease the fatigue and expense connected with this operation.

It is with such savings in mind that applicant offers the invention which forms the subject matter of this instrument. This device is concerned with such a device which will secure work pieces during drilling, tapping or broaching operations, and has been more particularly described in connection with the drilling of the piston end of automotive connecting rods.

Accordingly it is an object of this invention to provide a drilling clamp capable of rapid application and release and which will securely hold the work piece.

It is a further object of this invention to provide a clamp capable of adjustment with a minimum of delay when it is desired to change from one particular machining operation to another.

It is a further object of this invention to provide a clamp which is inexpensive to build and which requires a minimum of physical effort on the part of the operator.

With these and other objects in view, the invention comprises the arrangements, constructions, and combinations of the various elements of the structure described in the specification, claimed in the claims and illustrated in the accompanying drawings, in which:

Figure 1:
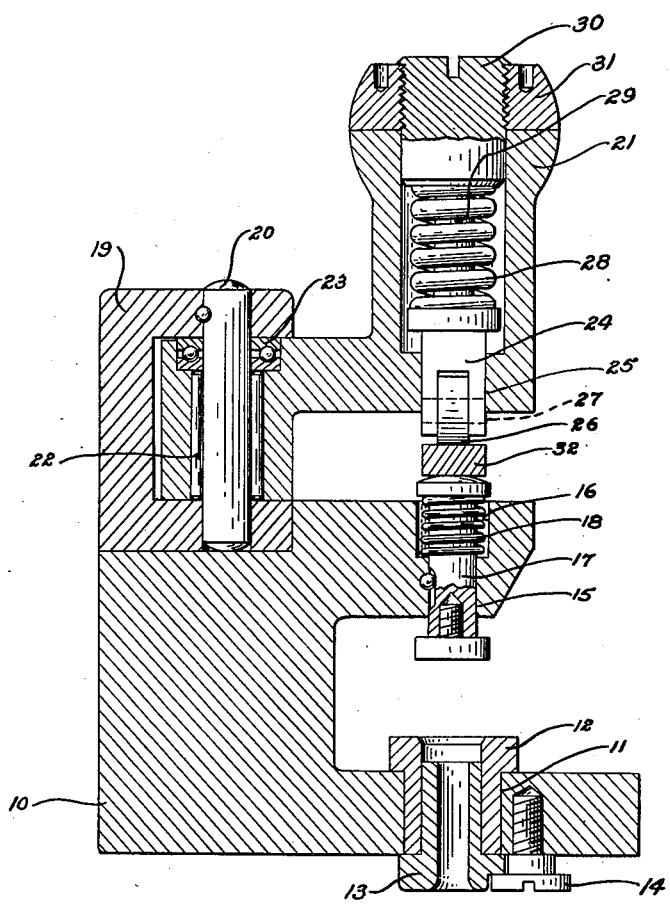
Figure 1 is a vertical section of the drilling clamp in the position assumed when a work piece is clamped and ready for drilling.

In Figure 1 the clamp body is designated as 10 and is roughly C shaped. The lower part of clamp body 10 is perforated to provide opening 11 in which is fitted bushing 12. Bushing 12 is in turn fitted with drill guide 13 which is held in place by screw 14. Above opening 11 and concentric therewith is opening 15 which opens upwardly into spring receptacle 16. Clamping member 17 reciprocates in opening 15 and is provided with enlargements at each end. Either or both of these enlargements are removably connected to clamping member 17. Clamping member 17 is urged upwardly by spring 18 operating in spring receptacle 16.

Pin retainer 19 is mounted on clamp body 10 and supports pin 20. Handle 21 rotates on pin 20. Needle bearing 22 and thrust bearing 23 are interposed between handle 21 and pin 20. Roller carrier 24 reciprocates in opening 25 in handle 21 and carries on its lower end roller 26 which is arranged to rotate on pin 27. Roller carrier 24 is urged downwardly by heavy compression spring 28. This spring is held in place by central shaft 29 which is an extension of roller carrier 24. The compression of spring 28 is established and adjusted by screwing adjusting plug 30 into handle 21. The proper adjustment, once obtained, is locked by tightening locking member 31 against handle 21.

Figures 2, 3:
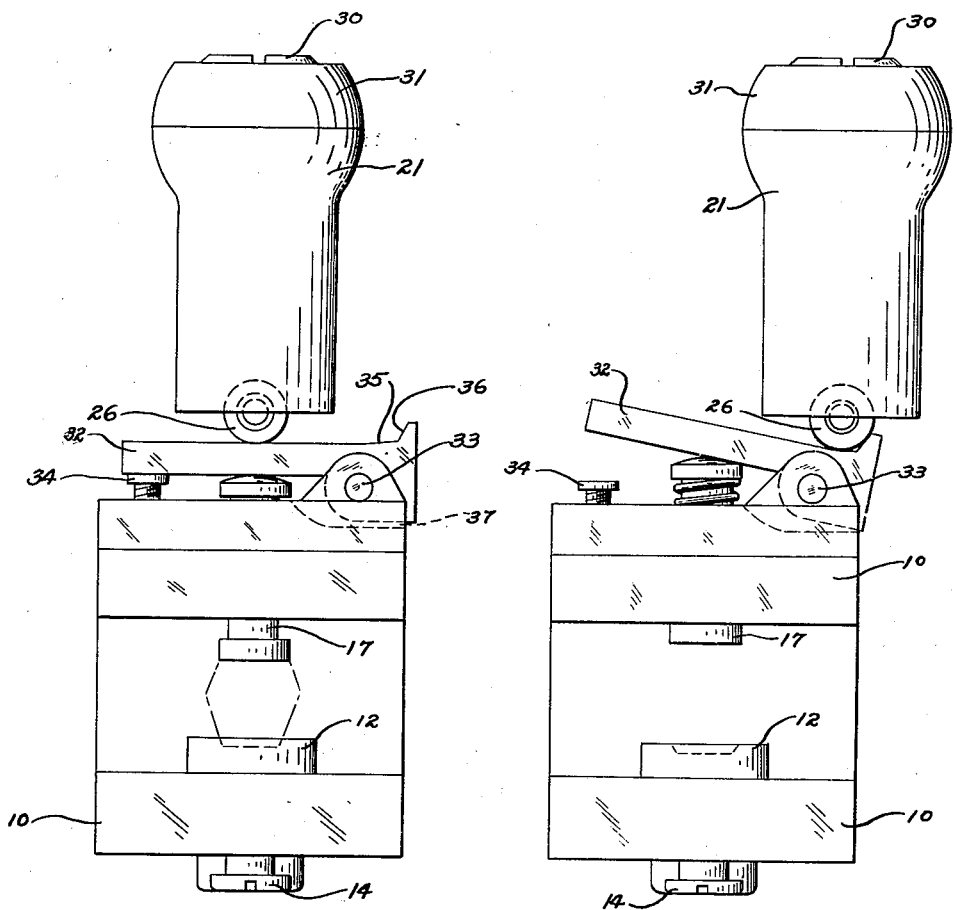
Figure 2 is an elevation of the drilling clamp taken at right angles to Figure 1 and also showing the position assumed when a work piece is clamped and ready for drilling.
Figure 3 is an elevation similar to Figure 2 except that the clamp is shown in the released position.

In Figure 2 the drilling clamp is also shown in the loaded position and ready for the drilling operation. In this drawing, roller 26 is shown in contact with the upper surface of track 32. Track 32 rotates about pivot 33 and is limited in its downward movement by set screw 34.

Figure 3 is similar to Figure 2 except that the clamp is shown in the released position. Here roller 26 has moved along track 32, over profiled surface 35 and come to rest against shoulder 36. The spring thrust transmitted through roller 26 causes clockwise rotation of track 32 around pivot 33. This rotation is limited by stop 37.

From the above description, it is thought that the operation of this clamp can be readily understood. As depicted in Figures 2 and 3, the upper surface of track 32 is planar except for profiled surface 35 and shoulder 36. The curve of profiled surface 35 is chosen so that the passage of roller 26 over it will cause a slight rotation of track 32 about pivot 33 in a clockwise direction with little or no vertical movement of roller 26. Starting with the clamp in the position shown in Figure 3, the operator inserts a work piece between bushing 12 (Figure 1) and clamping member 17 and then grasps handle 21 and moves roller 26 to the position shown in Figures 1 and 2. This action shifts the thrust of spring 28 from pivot 33 and stop 37 to the upper end of clamping member 17. This is not a sudden shift, but takes place progressively as the handle rotates about pin 20. This shift of thrust depresses clamping member 17 and compresses spring 18. Thus the entire thrust of spring 28 less the thrust of spring 18, is available for clamping action. Since the parts of the clamp are so arranged that very little vertical motion of clamping member 17 occurs between the clamping and unclamping position, very little effort is involved in the operation of this clamp. Set screw 34 is provided only to limit the downward movement of track 32 in case the clamp is closed before a work piece has been inserted. It is apparent that by adjusting the effective length of clamping member 17, or of bushing 12, this clamp can be readily changed to accommodate work pieces of various dimensions or configurations. From the construction of this clamp, the repetitious clamping of similar work pieces can be accomplished without the necessity of the operator actually applying the clamping effort. The required clamping effort is simply transferred from the clamp to the work piece and back again as needed.

What is claimed is:

1. In a clamping mechanism for the repetitious clamping of similar work pieces, a clamping member spring biased into the released position, a permanently energized clamping spring, a rocking bar pivoted intermediate its ends for applying the effort of the clamping spring to the clamping member, and means movable along said rocking bar from a position adjacent the clamping member to a position on the opposite side of the pivot for transferring the effort of the energized clamping spring from the clamping member to another portion of the clamping mechanism without deenergizing the clamping spring.

2. In a clamping mechanism for the repetitious clamping of similar work pieces, a clamping member spring biased into the released position, a permanently energized clamping spring, a rocking bar pivoted intermediate its ends for applying the effort of the clamping spring to the clamping member, and means movable along said rocking bar from a position in which the clamping member and clamping spring are substantially coaxial to a position on the opposite side of the pivot for transferring the effort of the energized clamping spring from the clamping member to another portion of the clamping mechanism without deenergizing the clamping spring.

EDWIN PLEASANCE.

REFERENCES CITED

The following references are of record in the file of this patent:

UNITED STATES PATENTS

| Number | Name | Date |
| --- | --- | --- |
| 438,104 | Folsom | Oct. 7, 1890 |
| 922,338 | Root | May 18, 1909 |
| 1,122,910 | Grant | Dec. 29, 1914 |
| 1,262,389 | Reynolds | Apr. 9, 1918 |
| 1,624,654 | Brittain | Apr. 12, 1927 |
| 1,658,748 | Swartz | Feb. 7, 1928 |
| 2,042,379 | Barnes | May 26, 1936 |
| 2,410,453 | Mills | Nov. 5, 1946 |
| 2,443,526 | Williamson | June 15, 1948 |

FOREIGN PATENTS

| Number | Country | Date |
| --- | --- | --- |
| 673,304 | Germany | Mar. 20, 1939 |